(12) United States Patent
Kuo et al.

(10) Patent No.: US 11,983,377 B2
(45) Date of Patent: May 14, 2024

(54) TOUCH MODULE

(71) Applicant: Primax Electronics Ltd., Taipei (TW)

(72) Inventors: Hung-Wei Kuo, Taipei (TW); Tse-Ping Kuan, Taipei (TW); Ying-Yen Huang, Taipei (TW); Wei-Chiang Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 3 days.

(21) Appl. No.: 18/204,229

(22) Filed: May 31, 2023

(65) Prior Publication Data

US 2024/0053857 A1    Feb. 15, 2024

Related U.S. Application Data

(60) Provisional application No. 63/396,816, filed on Aug. 10, 2022.

(51) Int. Cl.
*G06F 3/046*    (2006.01)
*G06F 3/041*    (2006.01)
*G06F 3/047*    (2006.01)

(52) U.S. Cl.
CPC .......... *G06F 3/046* (2013.01); *G06F 3/04164* (2019.05); *G06F 3/047* (2013.01)

(58) Field of Classification Search
CPC ...... G06F 3/046; G06F 3/04164; G06F 3/047; G06F 3/03547
See application file for complete search history.

(56) References Cited

U.S. PATENT DOCUMENTS

2018/0068774 A1*   3/2018   Wang .................. H01F 41/0246
2021/0333880 A1*  10/2021   Junus .................... G06F 3/045

* cited by examiner

*Primary Examiner* — Hang Lin
(74) *Attorney, Agent, or Firm* — KIRTON McCONKIE; Evan R. Witt

(57) ABSTRACT

A touch module includes a base plate, a magnet, a touchpad and a magnetic board. The magnetic board includes a first sensing line, a second sensing line, a third sensing line, a first communication part and a second communication part. The touchpad is located over the base plate. The magnetic board is arranged between the touchpad and the magnet. The first sensing line, the second sensing line and the third sensing line of the magnetic board are in parallel with each other and stacked on each other. The first sensing line is electrically connected with the second sensing line through the first communication part. The second sensing line is electrically connected with the third sensing line through the second communication part. The first sensing line, the second sensing line and the third sensing line sense a magnetic field of the magnet and generates a vibration.

11 Claims, 4 Drawing Sheets

TOUCH MODULE

CROSS-REFERENCE TO RELATED APPLICATION

This application claims priority to U.S. Provisional Patent Application No. U.S. 63/396,816 filed Aug. 10, 2022, the contents of which are incorporated herein by reference.

FIELD OF THE INVENTION

The present invention relates to a touch-sensitive input device, and more particularly to a touch module.

BACKGROUND OF THE INVENTION

Conventionally, when a touchpad is touched or pressed, the touchpad generates feedback to the user in order to prompt the user that the pressing action has been indeed executed and a corresponding pressing signal has been generated. Generally, the feedback effect from the touchpad is in the form of a vibration effect. This vibration is usually generated in response to the elastic feedback from an elastic dome switch button or an elastic piece under the touchpad.

Nowadays, the trends of designing electronic products (e.g., notebook computers) are toward slimness and small size. Since the volume of the elastic dome switch button or the elastic piece used in the conventional touchpad is large, the thickness of the conventional touchpad is increased. After the touchpad is installed in the notebook computer, the overall thickness and the overall volume are increased. In other words, the conventional touchpad cannot meet today's slimness requirements.

SUMMARY OF THE INVENTION

For solving the drawbacks of the conventional technologies, the present invention provides a touch module. The touch module includes magnetic coils and a magnet. When the magnetic coils sense a magnetic property (e.g., a magnetic field) of the magnet, the magnetic coils generate a vibrating effect. As the magnetic coils generate the vibrating effect, the touchpad is subjected to vibration, or the vibration is transmitted to the touchpad. Consequently, the user can feel the vibration feedback. The magnetic coils are stacked on each other in multiple layers. Moreover, the coils wound in separated wiring layers are connected with each other, and the winding directions of the coils in different layers are identical. Since the layered winding structure of the magnetic coils is dense and fine, the magnetic coils can precisely sense the magnetic field of the magnet and generate the strong vibration.

In accordance with an aspect of the present invention, a touch module is provided. The touch module includes a base plate, a magnet, a touchpad and a magnetic board. The base plate includes a top side. The magnet is located at the top side of the base plate. The touchpad is located over the top side of the base plate. The magnet is covered by the touchpad. The magnetic board is coupled with the touchpad and aligned with the magnet. The magnetic board includes a first wiring layer, a second wiring layer, a third wiring layer and a fourth wiring layer. The first wiring layer is located beside the magnet. The first wiring layer includes a first sensing line. The first sensing line is wound in a first direction. The first sensing line includes a first contacting terminal and a first conducting terminal. The second wiring layer is located over the first wiring layer. The second wiring layer includes a second sensing line. The second sensing line is wound in the first direction. The second sensing line includes a second contacting terminal and a second conducting terminal. The third wiring layer is located over the first wiring layer. The third wiring layer includes a third sensing line. The third sensing line is wound in the first direction. The third sensing line includes a third contacting terminal and a third conducting terminal. The fourth wiring layer is located over the third wiring layer. In addition, the fourth wiring layer is located near the touchpad. The fourth wiring layer includes a first communication part and a second communication part. The first wiring layer, the second wiring layer, the third wiring layer and the fourth wiring layer are in parallel with each other and stacked on each other. The first wiring layer, the second wiring layer, the third wiring layer and the fourth wiring layer are aligned with the magnet. The first sensing line of the first wiring layer is electrically connected with the second sensing line of the second wiring layer through the first communication part of the fourth wiring layer. The second sensing line of the second wiring layer is electrically connected with the third sensing line of the third wiring layer through the second communication part of the fourth wiring layer. The first sensing line, the second sensing line and the third sensing line sense a magnetic field of the magnet and generates a vibration.

In an embodiment, the first conducting terminal of the first sensing line is electrically connected with the first communication part of the fourth wiring layer, and the first communication part is electrically connected with the second contacting terminal of the second sensing line. Consequently, the first sensing line is electrically connected with the second sensing line through the first communication part.

In an embodiment, the second conducting terminal of the second sensing line is electrically connected with the second communication part of the fourth wiring layer, and the second communication part is electrically connected with the third contacting terminal of the third sensing line. Consequently, the second sensing line is electrically connected with the third sensing line through the second communication part.

In an embodiment, the second wiring layer further includes a first communication point, and the third wiring layer further includes a second communication point, a third communication point and a fourth communication point. The first communication point is separated from the second sensing line. The second communication point, the third communication point and the fourth communication point are separated from the third sensing line.

In an embodiment, the first conducting terminal of the first sensing line is electrically connected with the first communication part of the fourth wiring layer through the first communication point of the second wiring layer and the second communication point of the third wiring layer, and the first communication part is electrically connected with the second contacting terminal of the second sensing line through the third communication point of the third wiring layer.

In an embodiment, the second conducting terminal of the second sensing line is electrically connected with the second communication part of the fourth wiring layer through the fourth communication point of the third wiring layer, and the second communication part is electrically connected with the third contacting terminal of the third sensing line.

In an embodiment, the first communication part and the second communication part of the fourth wiring layer are separated from each other.

In an embodiment, the first wiring layer further includes a first layer body, the second wiring layer further includes a second layer body, the third wiring layer further includes a third layer body, and the fourth wiring layer further includes a fourth layer body. The first layer body, the second layer body, the third layer body and the fourth layer body are in parallel with each other and stacked on each other. The first layer body is located near the magnet. The fourth layer body is located near the touchpad.

In an embodiment, the first sensing line is wound in the first layer body in the first direction, the second sensing line is wound in the second layer body in the first direction, the third sensing line is wound in the third layer body in the first direction, and the first communication part and the second communication part are formed in the fourth layer body.

In an embodiment, the top side of the base plate includes a concave structure, and the magnet is disposed within the concave structure.

In an embodiment, the base plate further includes a supporting part. The supporting part is installed on the top side of the base plate. The supporting part is contacted with the touchpad.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
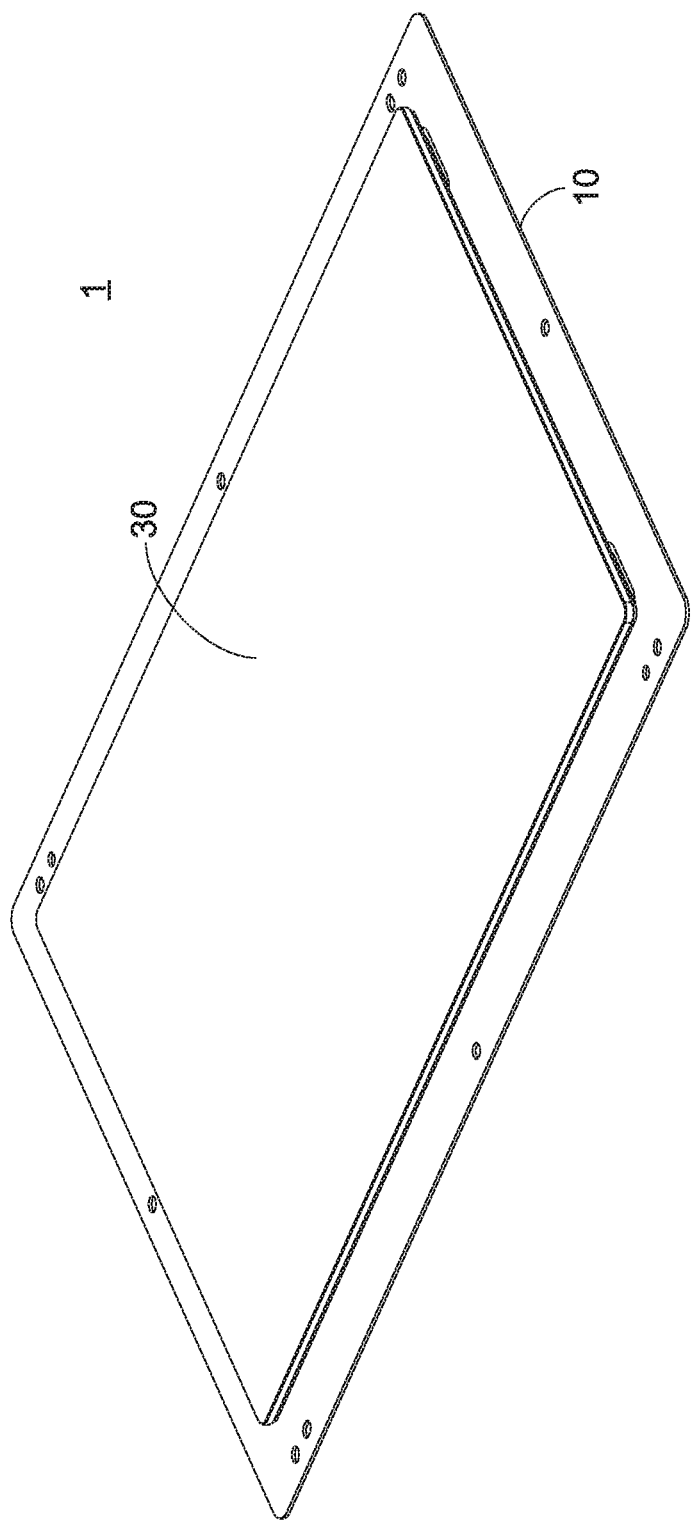
FIG. 1 is a schematic perspective view of a touch module according to an embodiment of the present invention.
Figure 2:
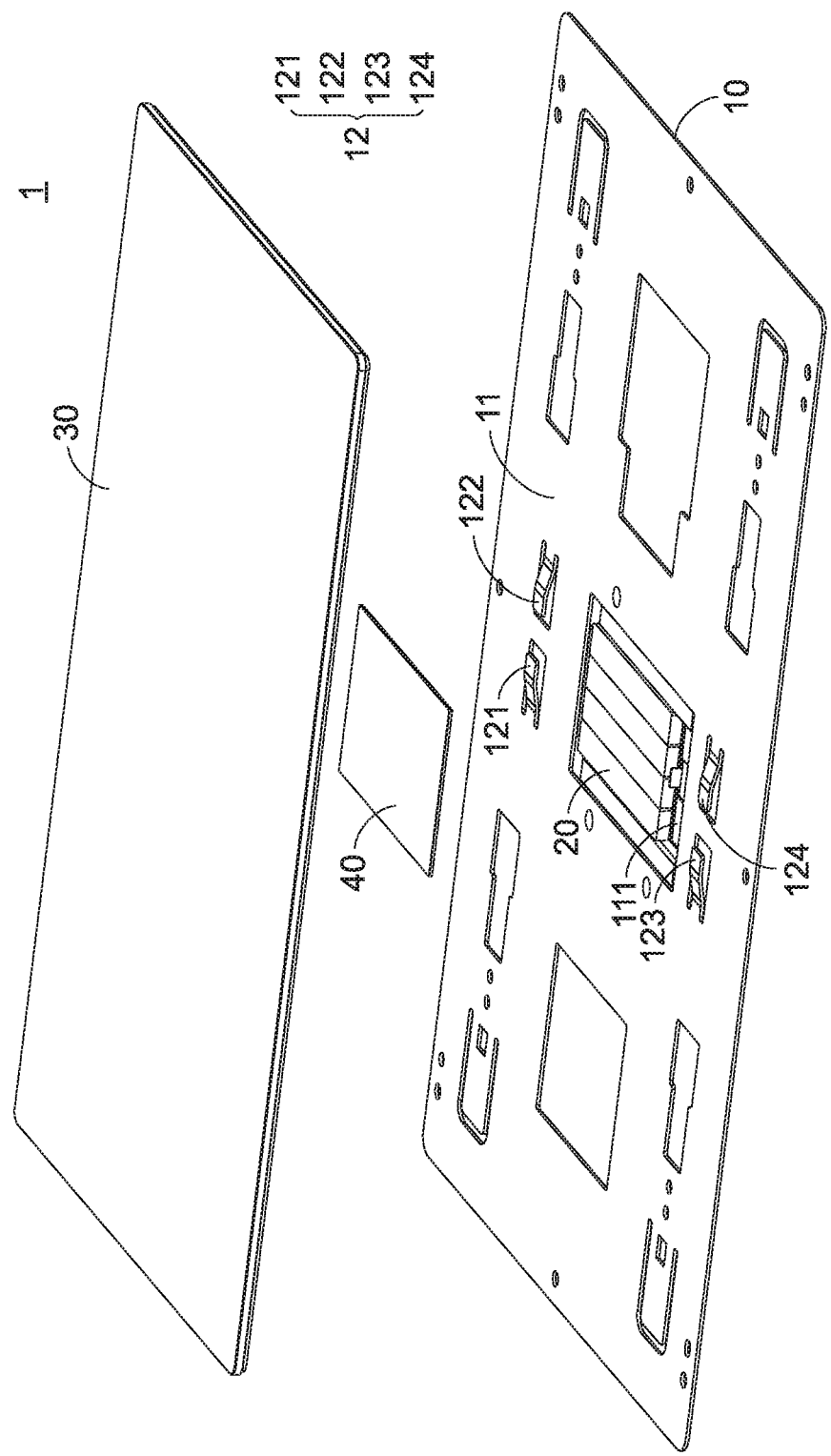
FIG. 2 is a schematic exploded view of the touch module according to the embodiment of the present invention.
Figure 3:
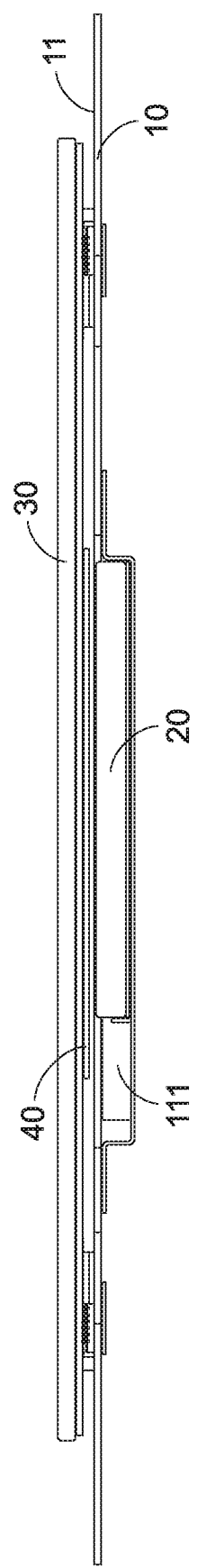
FIG. 3 is a schematic cross-sectional view of the touch module according to the embodiment of the present invention.

FIG. 1 is a schematic perspective view of a touch module according to an embodiment of the present invention. FIG. 2 is a schematic exploded view of the touch module according to the embodiment of the present invention. FIG. 3 is a schematic cross-sectional view of the touch module according to the embodiment of the present invention. As shown in FIGS. 1, 2 and 3, the touch module 1 comprises a base plate 10, a magnet 20, a touchpad 30 and a magnetic board 40.

The base plate 10 comprises a top side 11 and a supporting part 12. The top side 11 comprises a concave structure 111. The supporting part 12 comprises a first supporting piece 121, a second supporting piece 122, a third supporting piece 123 and a fourth supporting piece 124.

The magnet 20 is installed on the top side 11 of the base plate 10. Moreover, the magnet 20 is disposed within the concave structure 111 of the top side 11. The supporting part 12 of the base plate 10 is installed on the top side 11 and contacted with the touchpad 30. Moreover, the first supporting piece 121, the second supporting piece 122, the third supporting piece 123 and the fourth supporting piece 124 of the supporting part 12 are arranged around the periphery of the magnet 20.

The touchpad 30 is located over the top side 11 of the base plate 10. Moreover, the magnet 20 is covered by the touchpad 30. The supporting part 12 of the base plate 10 is contacted with the touchpad 30. That is, the first supporting piece 121, the second supporting piece 122, the third supporting piece 123 and the fourth supporting piece 124 of the supporting part 12 are contacted with the touchpad 30. Consequently, the touchpad 30 and the base plate 10 are separated from each other through the first supporting piece 121, the second supporting piece 122, the third supporting piece 123 and the fourth supporting piece 124.

The magnetic board 40 is coupled with the touchpad 30. In addition, the magnetic board 40 is aligned with the magnet 20. The magnetic board 40 is electrically connected with the touchpad 30 or a processor (not shown). The touchpad 30 or the processor can provide electricity to the magnetic board 40. When the user's finger touches the touchpad 30, electricity flows through the magnetic board 40. Meanwhile, the magnetic board 40 senses the magnetic property (e.g., the magnetic field) of the magnet 20 and results in vibration. The vibration of the magnetic board 40 is transmitted to the touchpad 30, or the touchpad 30 is correspondingly subjected to vibration. Consequently, the touch module 1 generates the vibration feedback to the user.

Figure 4:
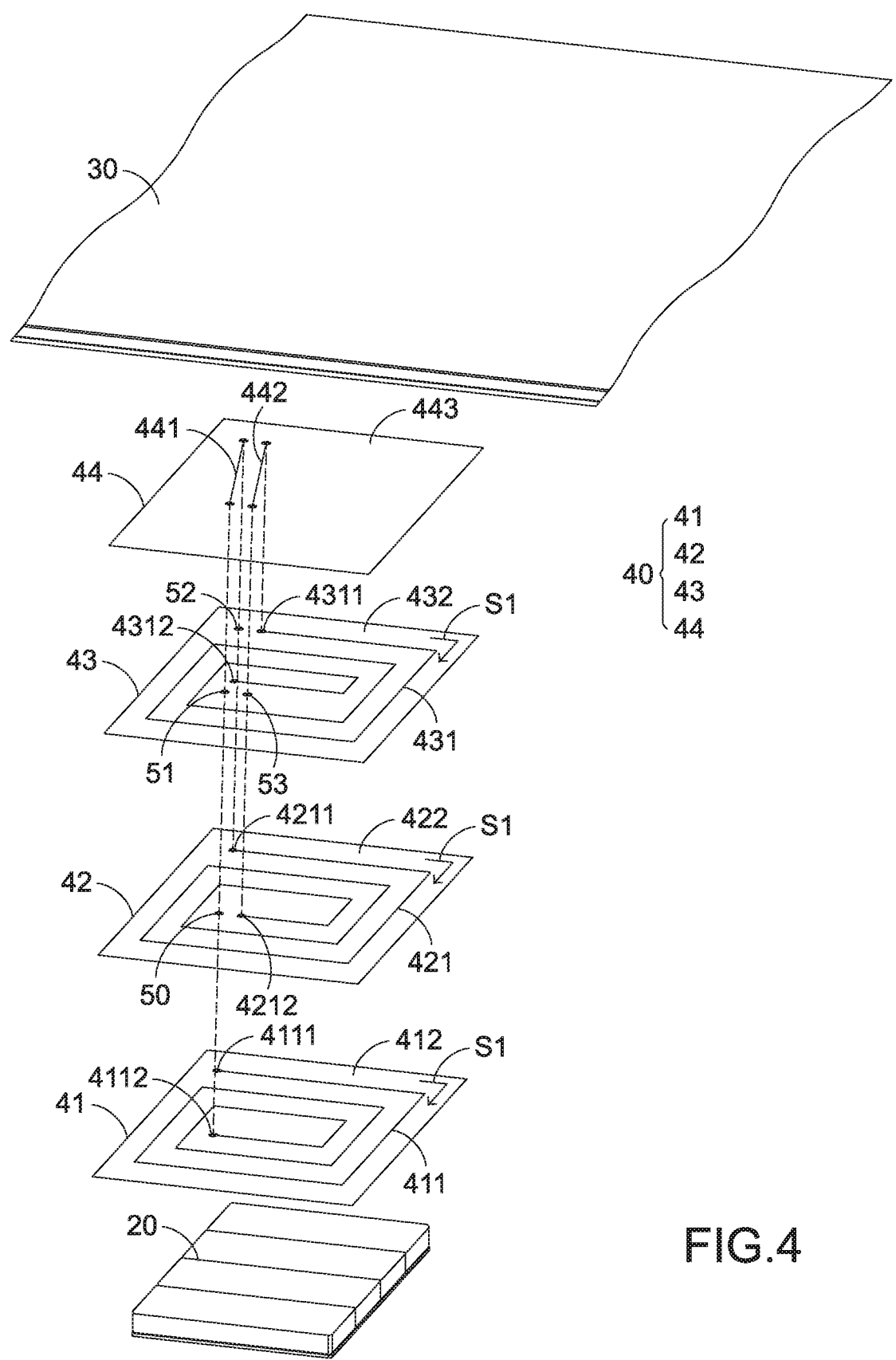
FIG. 4 is a schematic exploded view illustrating sensing lines in the magnetic board of the touch module according to the embodiment of the present invention.

The structure of the magnetic board 40 will be described in more details as follows. FIG. 4 is a schematic exploded view illustrating sensing lines in the magnetic board of the touch module according to the embodiment of the present invention.

As shown in FIG. 4, the magnetic board 40 comprises a first wiring layer 41, a second wiring layer 42, a third wiring layer 43 and a fourth wiring layer 44. The first wiring layer 41, the second wiring layer 42, the third wiring layer 43 and the fourth wiring layer 44 are in parallel with each other and stacked on each other. In addition, the first wiring layer 41, the second wiring layer 42, the third wiring layer 43 and the fourth wiring layer 44 are aligned with the magnet 20.

The first wiring layer 41 of the magnetic board 40 comprises a first sensing line 411. The first sensing line 411 is wound in a first direction S1. The first sensing line 411 comprises a first contacting terminal 4111 and a first conducting terminal 4112. The second wiring layer 42 of the magnetic board 40 comprises a second sensing line 421. The second sensing line 421 is also wound in the first direction S1. The second sensing line 421 comprises a second contacting terminal 4211 and a second conducting terminal 4212. The third wiring layer 43 of the magnetic board 40 comprises a third sensing line 431. The third sensing line 431 is also wound in the first direction S1. The third sensing line 431 comprises a third contacting terminal 4311 and a third conducting terminal 4312. The fourth wiring layer 44 of the magnetic board 40 comprises a first communication part 441 and a second communication part 442. The first communication part 441 and the second communication part 442 are separated from each other.

As mentioned above, all of the first sensing line 411, the second sensing line 421 and third sensing line 431 are wound in the first direction S1. That is, the first sensing line 411, the second sensing line 421 and the third sensing line 431 are wound in the same direction and wound as coils. For example, the first direction S1 is a clockwise direction or a counterclockwise direction.

The first sensing line 411 of the first wiring layer 41 is electrically connected with the second sensing line 421 of the second wiring layer 42 through the first communication part 441 of the fourth wiring layer 44. Then, the second sensing line 421 of the second wiring layer 42 is electrically connected with the third sensing line 431 of the third wiring layer 43 through the second communication part 442 of the fourth wiring layer 44. Consequently, the first sensing line 411, the second sensing line 421 and the third sensing line 431 are electrically connected with each other. When electricity flows through the magnetic board 40, the electricity flows through the first sensing line 411, the second sensing line 421 and the third sensing line 431. Consequently, the magnetic board 40 senses the magnetic property (e.g., the magnetic field) of the magnet 20 and results in vibration.

In an embodiment, the first wiring layer 41 of the magnetic board 40 further comprises a first layer body 412. The first sensing line 411 is wound in the first layer body 412 in the first direction S1 and formed as a planar coil. The second wiring layer 42 of the magnetic board 40 further comprises a second layer body 422. The second sensing line 421 is wound in the second layer body 422 in the first direction 51 and formed as a planar coil. The third wiring layer 43 of the magnetic board 40 further comprises a third layer body 432. The third sensing line 431 is wound in the third layer body 432 in the first direction 51 and formed as a planar coil. The fourth wiring layer 44 of the magnetic board 40 further comprises a fourth layer body 443. The first communication part 441 and the second communication part 442 are formed in the fourth layer body 443. The first layer body 412, the second layer body 422, the third layer body 432 and the fourth layer body 443 are in parallel with each other and stacked on each other. The first layer body 412 is located near the magnet 20. The fourth layer body 443 is located near the touchpad 30. Due to the above structural design, the magnetic board 40 is a stack structure of multilayered planar coils.

The connecting relationships between the sensing lines of the four wiring layers of the magnetic board 40 will be described in more details as follows. The second wiring layer 42 of the magnetic board 40 further comprises a first communication point 50. The third wiring layer 43 of the magnetic board 40 further comprises a second communication point 51, a third communication point 52 and a fourth communication point 53. The first communication point 50 is separated from the second sensing line 421 of the second wiring layer 42. In addition, the second communication point 51, the third communication point 52 and the fourth communication point 53 are separated from the third sensing line 431 of the third wiring layer 43.

The first contacting terminal 4111 of the first sensing line 411 of the first wiring layer 41 is formed in the first layer body 412. The first conducting terminal 4112 of the first sensing line 411 is electrically connected with the first communication part 441 of the fourth wiring layer 44 through the first communication point 50 of the second wiring layer 42 and the second communication point 51 of the third wiring layer 43. Then, the first communication part 441 of the fourth wiring layer 44 is electrically connected with the second contacting terminal 4211 of the second sensing line 421 of the second wiring layer 42 through the third communication point 52 of the third wiring layer 43. In other words, the first conducting terminal 4112 of the first sensing line 411 is electrically connected with the second contacting terminal 4211 of the second sensing line 421 through the first communication part 441 of the fourth wiring layer 44.

In addition, the second conducting terminal 4212 of the second sensing line 421 is electrically connected with the second communication part 442 of the fourth wiring layer 44 through the fourth communication point 53 of the third wiring layer 43. Then, the second communication part 442 of the fourth wiring layer 44 is electrically connected with the third contacting terminal 4311 of the third sensing line 431 of the third wiring layer 43. In other words, the second conducting terminal 4212 of the second sensing line 421 is electrically connected with the third contacting terminal 4311 of the third sensing line 431 through the second communication part 442 of the fourth wiring layer 44. The third conducting terminal 4312 of the third sensing line 431 is formed in the third layer body 432. The third conducting terminal 4312 can be further connected with another component (not shown) or connected with the sensing line of another wiring layer.

As mentioned above, the first sensing line 411 is electrically connected with the second sensing line 421 through the first communication part 441 of the fourth wiring layer 44, and the second sensing line 421 is electrically connected with the third sensing line 431 through the second communication part 442 of the fourth wiring layer 44. In this way, the winding directions of the sensing lines can be tailored. That is, all of the sensing lines are wound in the first direction S1. Furthermore, since the sensing lines are connected with each other across different wiring layers, the structure of the magnetic board is more stable, the closeness between the wiring lines is increased, and the magnetic induction and vibration efficacy is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module, comprising:
   a base plate comprising a top side;
   a magnet located at the top side of the base plate;
   a touchpad located over the top side of the base plate, wherein the magnet is covered by the touchpad; and
   a magnetic board coupled with the touchpad and aligned with the magnet, wherein the magnetic board comprises:
   a first wiring layer located beside the magnet, and comprising a first sensing line, wherein the first sensing line is wound in a first direction, and the first sensing line comprises a first contacting terminal and a first conducting terminal;
   a second wiring layer located over the first wiring layer, and comprising a second sensing line, wherein the second sensing line is wound in the first direction, and the second sensing line comprises a second contacting terminal and a second conducting terminal;
   a third wiring layer located over the first wiring layer, and comprising a third sensing line, wherein the third sensing line is wound in the first direction, and the third sensing line comprises a third contacting terminal and a third conducting terminal; and
   a fourth wiring layer located over the third wiring layer, and located near the touchpad, wherein the fourth wiring layer comprises a first communication part and a second communication part, wherein the first wiring layer, the second wiring layer, the third wiring layer and the fourth wiring layer are in parallel with each other and stacked on each other, and the first wiring layer, the second wiring layer, the third wiring layer and the fourth wiring layer are aligned with the magnet, wherein the first sensing line of the first wiring layer is electrically connected with the second sensing line of the second wiring layer through the first communication part of the fourth wiring layer, and the second sensing line of the second wiring layer is electrically connected with the third sensing line of the third wiring layer through the second communication part of the fourth wiring layer, wherein the first sensing line, the second sensing line and the third sensing line sense a magnetic field of the magnet and generates a vibration.

2. The touch module according to claim 1, wherein the first conducting terminal of the first sensing line is electrically connected with the first communication part of the fourth wiring layer, and the first communication part is electrically connected with the second contacting terminal of the second sensing line, so that the first sensing line is electrically connected with the second sensing line through the first communication part.

3. The touch module according to claim 1, wherein the second conducting terminal of the second sensing line is electrically connected with the second communication part of the fourth wiring layer, and the second communication part is electrically connected with the third contacting terminal of the third sensing line, so that the second sensing line is electrically connected with the third sensing line through the second communication part.

4. The touch module according to claim 1, wherein the second wiring layer further comprises a first communication point, and the third wiring layer further comprises a second communication point, a third communication point and a fourth communication point, wherein the first communication point is separated from the second sensing line, and the second communication point, the third communication point and the fourth communication point are separated from the third sensing line.

5. The touch module according to claim 4, wherein the first conducting terminal of the first sensing line is electrically connected with the first communication part of the fourth wiring layer through the first communication point of the second wiring layer and the second communication point of the third wiring layer, and the first communication part is electrically connected with the second contacting terminal of the second sensing line through the third communication point of the third wiring layer.

6. The touch module according to claim 4, wherein the second conducting terminal of the second sensing line is electrically connected with the second communication part of the fourth wiring layer through the fourth communication point of the third wiring layer, and the second communication part is electrically connected with the third contacting terminal of the third sensing line.

7. The touch module according to claim 1, wherein the first communication part and the second communication part of the fourth wiring layer are separated from each other.

8. The touch module according to claim 1, wherein the first wiring layer further comprises a first layer body, the second wiring layer further comprises a second layer body, the third wiring layer further comprises a third layer body, and the fourth wiring layer further comprises a fourth layer body, wherein the first layer body, the second layer body, the third layer body and the fourth layer body are in parallel with each other and stacked on each other, the first layer body is located near the magnet, and the fourth layer body is located near the touchpad.

9. The touch module according to claim 8, wherein the first sensing line is wound in the first layer body in the first direction, the second sensing line is wound in the second layer body in the first direction, the third sensing line is wound in the third layer body in the first direction, and the first communication part and the second communication part are formed in the fourth layer body.

10. The touch module according to claim 1, wherein the top side of the base plate comprises a concave structure, and the magnet is disposed within the concave structure.

11. The touch module according to claim 1, wherein the base plate further comprises a supporting part, wherein the supporting part is installed on the top side of the base plate, and the supporting part is contacted with the touchpad.

\* \* \* \* \*